US012798352B2

(12) United States Patent
Nagao et al.

(10) Patent No.: US 12,798,352 B2
(45) Date of Patent: Nov. 17, 2026

(54) ELECTRIFIED VEHICLE

(71) Applicant: TOYOTA JIDOSHA KABUSHIKI KAISHA, Toyota (JP)

(72) Inventors: Takashi Nagao, Miyoshi (JP); Tatsuro Hamada, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 209 days.

(21) Appl. No.: 18/911,273

(22) Filed: Oct. 10, 2024

(65) Prior Publication Data

US 2025/0242679 A1 Jul. 31, 2025

(30) Foreign Application Priority Data

Jan. 25, 2024 (JP) ................................ 2024-009447

(51) Int. Cl.
*B60K 1/04* (2019.01)
*B60L 50/60* (2019.01)

(52) U.S. Cl.
CPC ................ *B60K 1/04* (2013.01); *B60L 50/66* (2019.02); *B60K 2001/0438* (2013.01)

(58) Field of Classification Search
CPC ... B60K 1/04; B60K 2001/0438; B60L 50/66; B60R 16/0215
See application file for complete search history.

(56) References Cited

U.S. PATENT DOCUMENTS

2015/0195960 A1* 7/2015 Seki .................. H01M 10/6561 361/690
2021/0122222 A1* 4/2021 Meckenstock ...... H01M 50/244

FOREIGN PATENT DOCUMENTS

JP 2011-229284 A 11/2011

* cited by examiner

*Primary Examiner* — Timothy Hannon
(74) *Attorney, Agent, or Firm* — SoraIP, Inc.

(57) ABSTRACT

An electrified vehicle comprising: an inverter disposed on a floor tunnel; and a flow regulating plate extending obliquely downward from a rear portion of the inverter toward a vehicle rear side, wherein the flow regulating plate has a protruding portion extending in the vehicle front-rear direction on a lower surface thereof.

4 Claims, 6 Drawing Sheets

ELECTRIFIED VEHICLE

CROSS-REFERENCE TO RELATED APPLICATION

This application claims priority to Japanese Patent Application No. 2024-009447 filed on Jan. 25, 2024, incorporated herein by reference in its entirety.

BACKGROUND

1. Technical Field

The present disclosure relates to a configuration of an electrified vehicle in which an electrical component is disposed on a floor tunnel.

2. Description of Related Art

In recent years, the number of electrical components disposed in vehicle cabins has increased with electrification of automobiles (see Japanese Unexamined Patent Application Publication No. 2011-229284 (JP 2011-229284 A), for example).

SUMMARY

Incidentally, vehicles traveling off-road have been increasingly electrified in recent years. Since such off-road electrified vehicles may travel over a river, electrical components are disposed on floor tunnels so as not to be submerged in the case of the river crossing traveling. However, water that has entered vehicle cabins may flow in the vehicles, and the water may thus splash up to the electrical components disposed on the floor tunnels during river crossing traveling.

Thus, an object of the present disclosure is to reduce water splashing to an electrical component disposed on a floor tunnel during river crossing traveling.

An electrified vehicle according to the present disclosure is an electrified vehicle including: an electrical component that is disposed on a floor tunnel; and a flow regulating plate that extends from a rear portion of the electrical component toward a vehicle rear obliquely lower side, in which the flow regulating plate includes, on a lower surface, a protruding portion that extends in a vehicle front-rear direction.

In this manner, water that has entered a vehicle cabin during river crossing traveling is regulated by the protruding portion provided on the flow regulating plate and then flows backward. Therefore, wave rising of a water surface of the water that has entered the vehicle cabin is reduced, and it is possible to reduce the water splashing to the electrical component disposed on the floor tunnel due to the wave rising.

In the electrified vehicle of the present disclosure, in the flow regulating plate, right and left side end portions may be connected to a rear end portion that extends in a vehicle width direction with the right and left side end portions inclined toward a center in the vehicle width direction as the right and left side end portions approach a vehicle rear side, and the right and left side end portions may include flanges that extend in a downward direction.

In this manner, water flowing along the lower surface of the flow regulating plate is collected at a center portion of the flow regulating plate on the rear side and is then caused to flow out on the vehicle rear side from the central portion, and it is thus possible to locate, on the vehicle rear side separated from the electrical component, the position where the wave rising of water that has entered the vehicle cabin occurs. It is thus possible to reduce water flashing to the electrical component due to wave rising.

The electrified vehicle of the present disclosure may include

- a console box that accommodates the electrical component and the flow regulating plate inside the console box,
- the console box may include
- a body that is attached to an upper portion of the floor tunnel and accommodates the electrical component inside the body, and
- a cable cover that is disposed adjacent to a rear side of the body and accommodates the flow regulating plate inside the cable cover, and
- the cable cover may include a rib that projects toward the flow regulating plate on a surface facing the flow regulating plate and extends in the vehicle width direction.

It is thus possible to reduce flowing of water that has been circulated between the flow regulating plate and the cable cover toward the vehicle front side and into the electrical component.

In the electrified vehicle of the present disclosure,

- the electrical component may be accommodated in a component case,
- the component case may be attached to an upper portion of the floor tunnel, and
- the flow regulating plate may be attached to an upper rear side of the component case and extend from the component case toward the vehicle rear obliquely lower side.

It is thus possible to splashing of the water that has entered the vehicle cabin to the electrical component.

According to the present disclosure, it is possible to reducing water flashing to an electrical component disposed on a floor tunnel during river crossing traveling.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
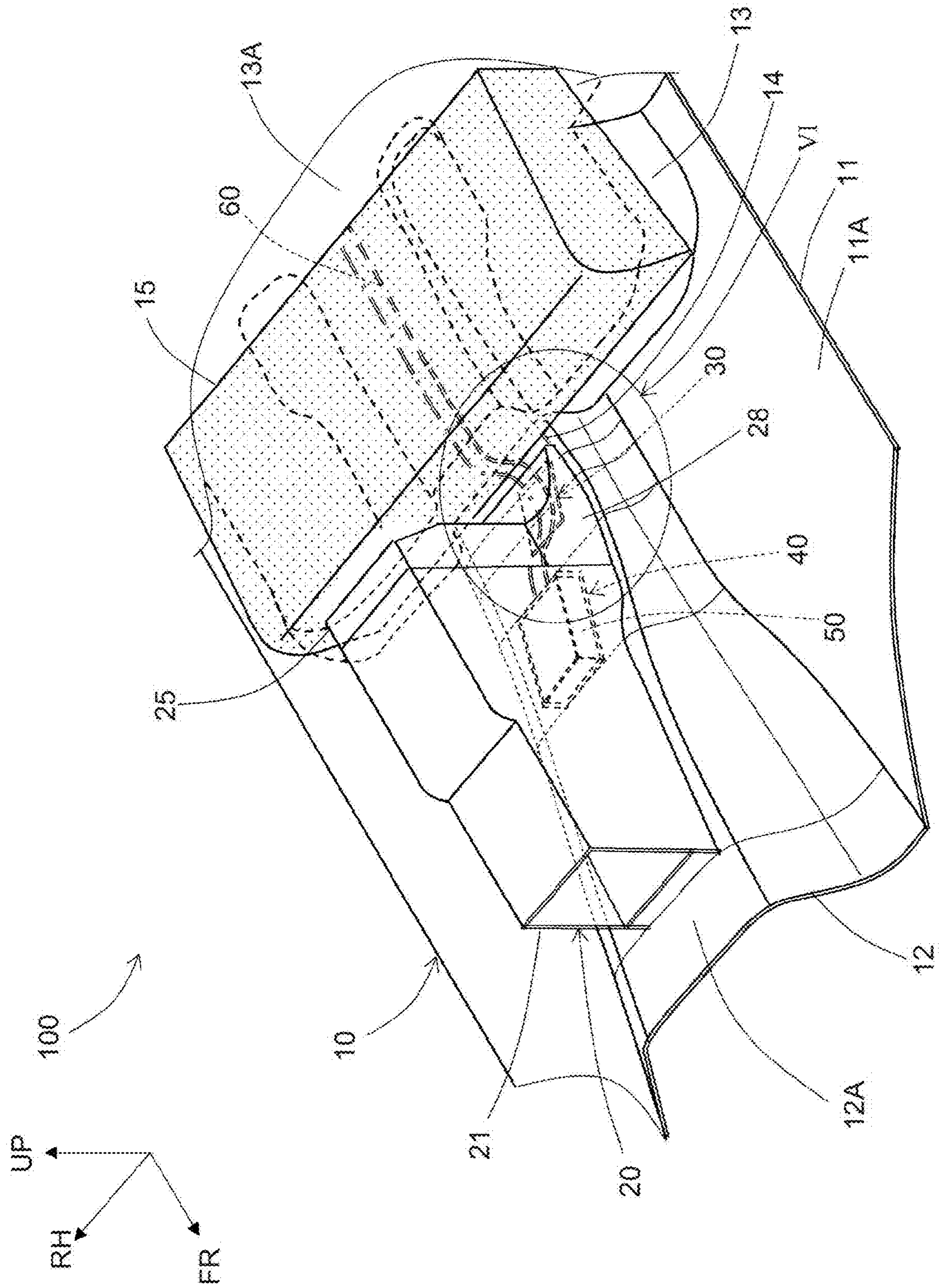
FIG. 1 is a perspective view of a vehicle cabin of an electrified vehicle according to an embodiment.

Hereinafter, electrified vehicle 100 of embodiments will be described referring to the drawings. Electrified vehicle 100 will be described as a battery electrified vehicle (hereinafter referred to as BEV). Electrified vehicle 100 may be a hybrid electric vehicle running on an engine/motor. As shown in FIG. 1, electrified vehicle 100 includes a vehicle cabin 10, a console box 20, an inverter case 40 as a component case, an inverter 50 as an electrical component, a flow regulating plate 30, and a high-voltage cable 60. Note that FR, UP, RH shown in the drawings indicate the front side, the upper side, and the right side of electrified vehicle 100, respectively. In addition, the opposite directions of FR, UP, RH indicate the rear side, the lower side, and the left side. Hereinafter, when simply describing using the front-rear, left-right, and up-down directions, the front-rear, left-right, and up-down directions of electrified vehicle 100 in the front-rear direction, the left-right direction, and the up-down direction, unless otherwise specified.

The vehicle cabin 10 includes a floor panel 11, a floor tunnel 12, and a rear floor panel 13. The floor panel 11 is a plate member constituting the floor of the vehicle cabin 10. The floor tunnel 12 is disposed at a center portion of the vehicle cabin 10 in the vehicle-width direction and protrudes upward from the upper surface 11A of the floor panel 11. The floor tunnel 12 has a groove-shaped cross section opened downward, and extends from a dash panel (not shown) in front of the vehicle cabin to the front of the rear floor panel 13 toward the rear of the vehicle. The rear floor panel 13 is a pedestal-shaped portion that rises upward from the floor panel 11 behind the floor tunnel 12. Left and right front seats (not shown) are mounted on the floor panel 11 on both sides of the floor tunnel 12. A rear seat 15 is attached above the rear floor panel 13. An area above the upper surface 11A of the floor panel 11, an area above the upper surface 12A of the floor tunnel 12, and an area above the upper surface 13A of the rear floor panel 13 constitute an area in the vehicle cabin.

A console box 20 is mounted on the floor tunnel 12. The console box 20 is an interior component that houses small objects therein. The console box 20 includes a body 21, an end panel 25, and a cable cover 28. As will be described later, the body 21 is attached to the upper surface 12A of the floor tunnel 12 via an inverter case 40 disposed therein. An inverter 50 is mounted inside the inverter case 40. A flow regulating plate 30 is accommodated in the cable cover 28. The flow regulating plate 30 is attached to the upper rear of the inverter case 40 and extends from the inverter case 40 obliquely downward toward the rear of the vehicle. A high-voltage cable 60 is connected to the inverter 50. The high-voltage cable 60 is housed inside the cable cover 28 and extends from the inverter 50 toward the rear of the vehicle. A floor trim 14 is attached between the cable cover 28 and the rear floor panel 13.

Figure 2:
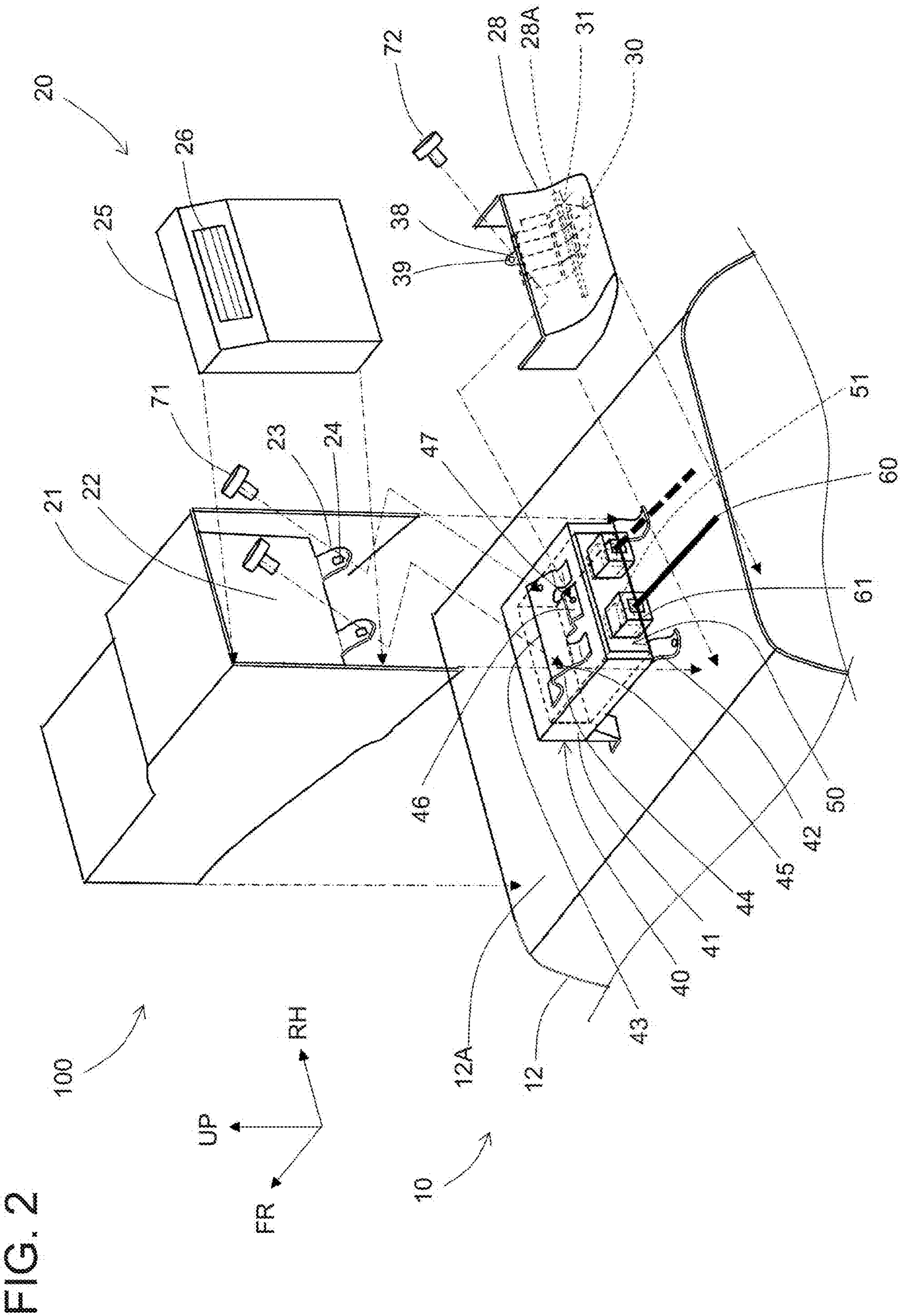
FIG. 2 is an exploded perspective view showing a console box, an inverter case, an inverter, a high-voltage cable, and a flow regulating plate shown in FIG. 1.

As shown in FIG. 2, the inverter case 40 is made of metal and includes a housing portion 41, lower brackets 42, and an upper bracket 43. The housing portion 41 has a rectangular box shape with open front and rear sides. An inverter 50, which is an electrical component, is attached to a bottom surface of the inside of the housing portion 41. The lower brackets 42 are leg portions that are attached to the lower surfaces of the front end and the rear end of the housing portion 41 and extend in the downward direction. The lower brackets 42 are attached to the upper surface 12A of the floor tunnel 12 by fastening members such as bolts. The upper bracket 43 is attached to the upper surface of the housing portion 41. The upper bracket 43 includes a base portion 44 to which the body 21 of the console box 20 is fastened, and a tongue portion 46 to which the flow regulating plate 30 is fastened. The base portion 44 has an upwardly convex hat-shaped cross-section and is provided with a screw hole 45 in the web. The tongue portion 46 is a plate member extending in a crank shape toward the vehicle rear side at the vehicle width direction center portion of the base portion 44. The tongue portion 46 is disposed at an upper rear portion of the inverter case 40. The tongue portion 46 is provided with a bolt hole 47. A fixing nut 73 (see FIG. 6) is set on the lower surface of the tongue portion 46.

A connection terminal 51 is provided at a rear end of the inverter 50 attached to the housing portion 41. The connector 61 of the high-voltage cable 60 is connected to the connection terminal 51. The high-voltage cable 60 extends from the rear end of the inverter 50 toward the rear of the vehicle above the floor tunnel 12.

As described above, the console box 20 includes the body 21, the end panel 25, and the cable cover 28. The body 21 is attached to the upper surface 12A of the floor tunnel 12. The body 21 includes a box portion 22 made of resin and containing small objects. An arm portion 23 extending in an obliquely downward direction is provided at a rear end of the box portion 22. The arm portion 23 is provided with a bolt hole 24.

The end panel 25 is a member attached to the upper portion of the rear end of the body 21. The end panel 25 is made of resin, and is provided with a blowout port 26 for blowing out the conditioned air toward the rear. The cable cover 28 is made of resin and is disposed adjacent to the body 21 at a lower portion of the rear of the body 21. The cable cover 28 is provided with a rib 28A protruding toward the flow regulating plate 30 on the lower surface facing the flow regulating plate 30 and extending in the vehicle-width direction (see FIG. 6).

Figure 3:
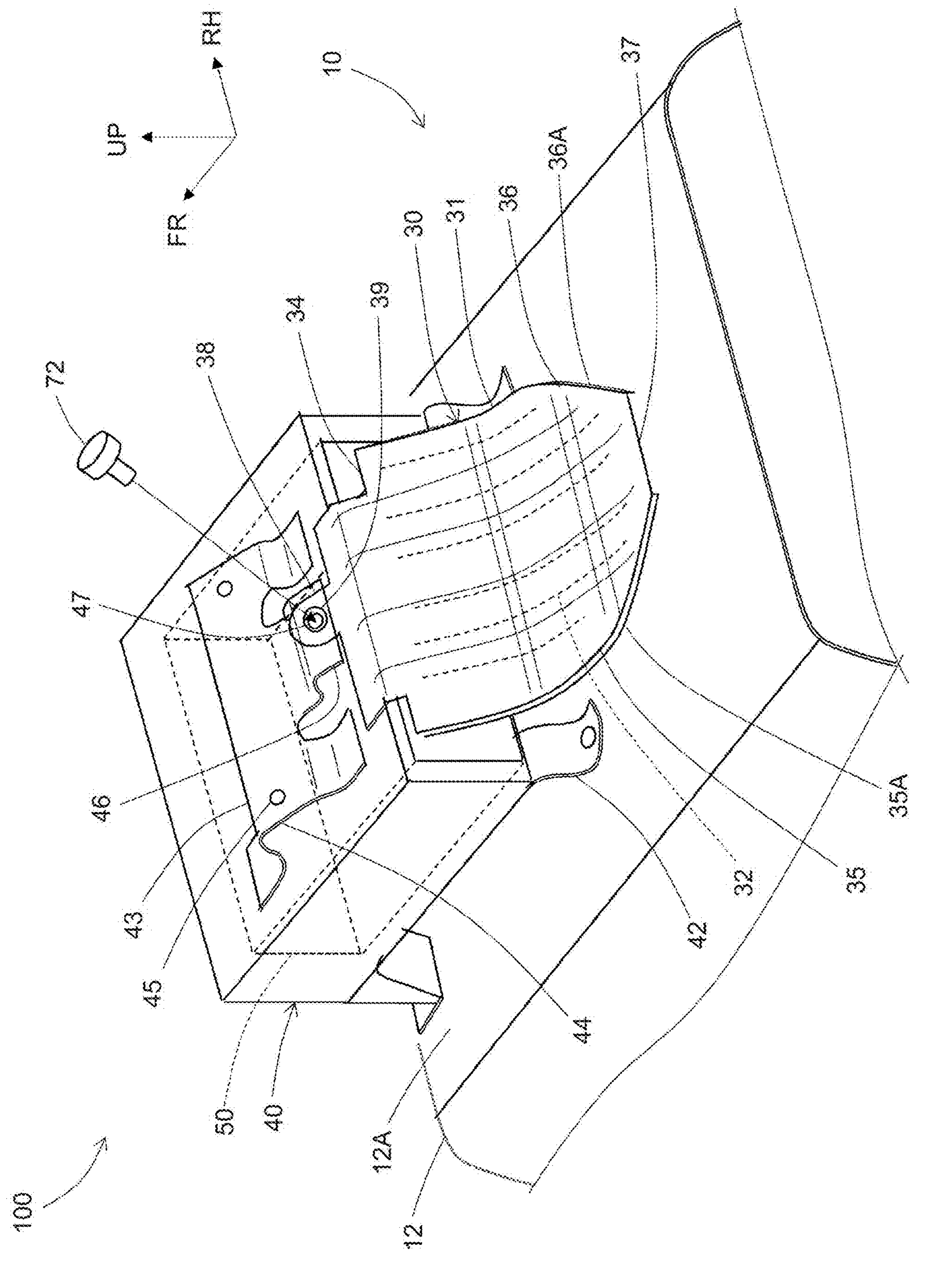
FIG. 3 is an enlarged perspective view illustrating a fastening portion between an inverter case and a flow regulating plate.
Figure 4:
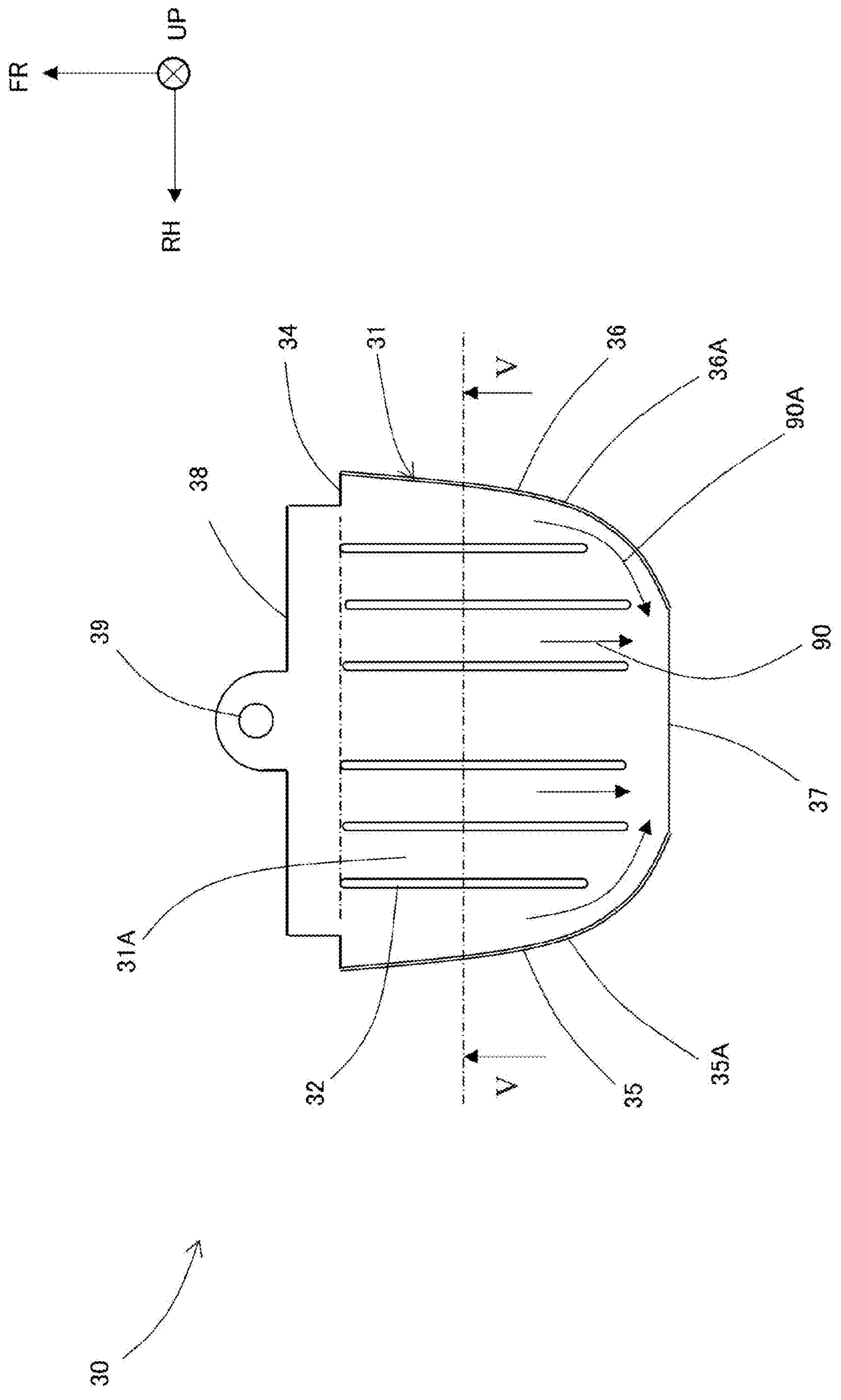
FIG. 4 is a bottom view illustrating a lower surface of the flow regulating plate.
Figure 5:
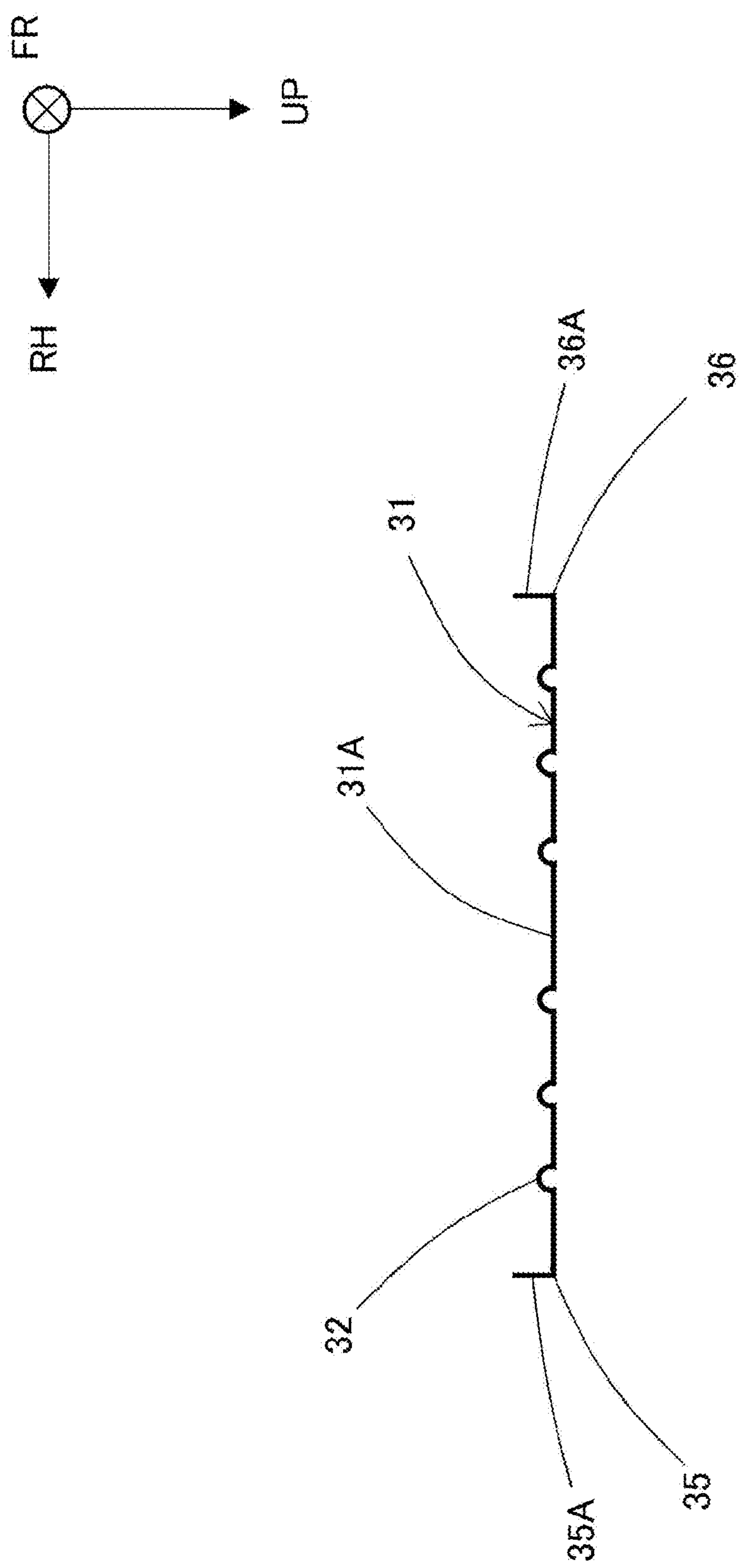
FIG. 5 is a cross-sectional view of the flow regulating plate, V-V cross-section shown in FIG. 4.

As illustrated in FIGS. 3 and 4, the flow regulating plate 30 includes a plate-shaped portion 31 and a fastening portion 38 protruding from the plate-shaped portion 31 toward the front of the vehicle. The plate-shaped portion 31 extends from the fastening portion 38 in the vehicle rear obliquely downward direction. The plate-shaped portion 31 is partitioned by a front end portion 34, left and right side end portions 35 and 36, and a rear end portion 37. The left and right side end portions 35 and 36 are inclined toward the center in the vehicle width direction toward the rear of the vehicle and are connected to the rear end portion 37. The rear end portion 37 extends in the vehicle width direction. As shown in FIG. 5, the left and right side end portions 35 and 36 are provided with left and right flanged 35A, 36A extending downward. A bolt hole 39 is provided in the fastening portion 38.

As shown in FIG. 4, the lower surface 31A of the plate-shaped portion 31 is provided with a plurality of protruding portions 32 extending in the front-rear direction of the vehicle. As shown in FIG. 5, the protruding portions 32 protrude downward from the lower surface 31A of the plate-shaped portion 31.

Figure 6:
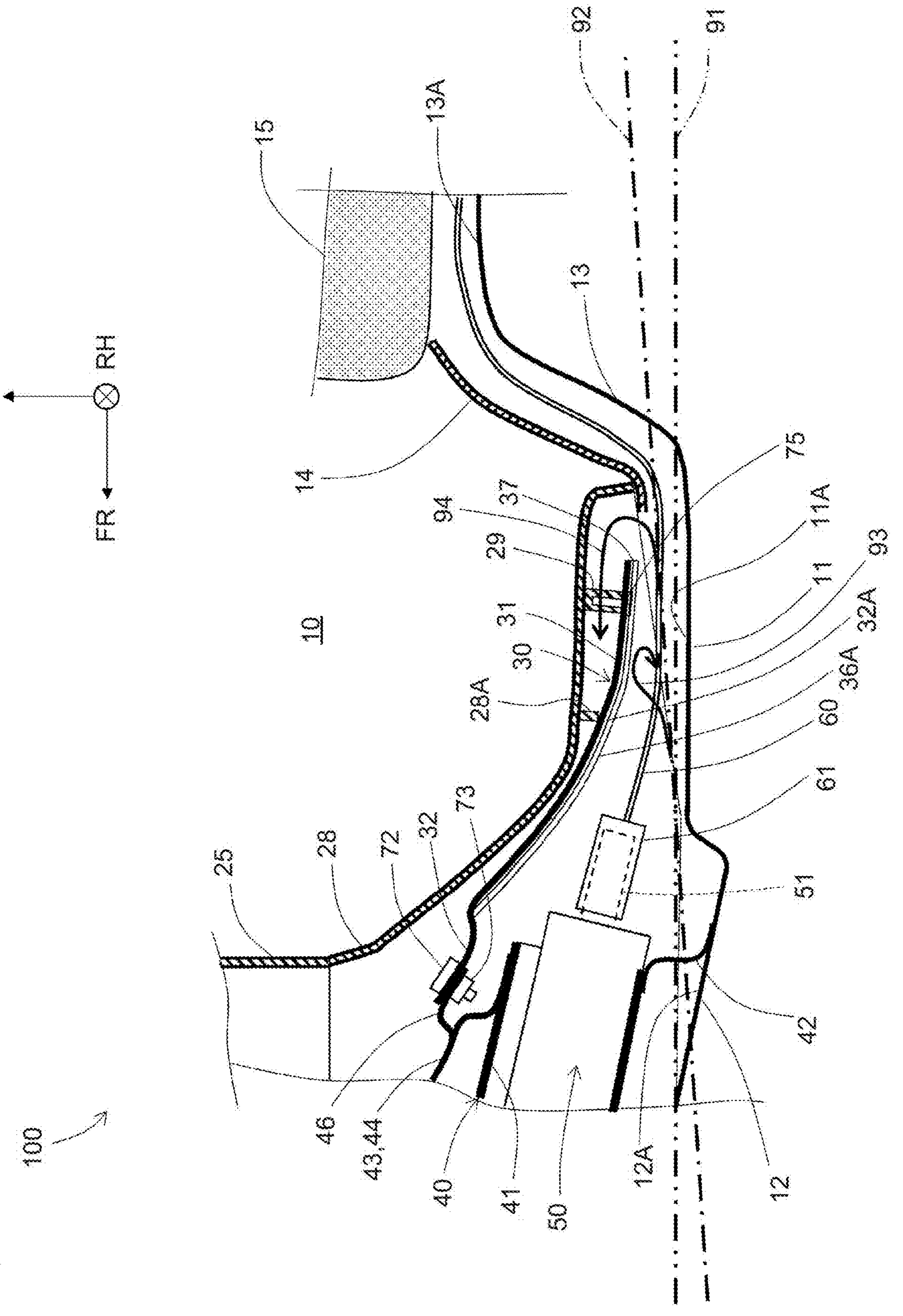
FIG. 6 is a cross-sectional view of VI portion shown in FIG. 1, showing the flow of water when electrified vehicle is traveling along the river.

As shown in FIG. 6, a pin seat 29 is provided on an inner surface of the cable cover 28. The rear portion of the flow regulating plate 30 is attached to the inner surface of the cable cover 28 by a pin 75.

Next, the assembly procedure of the console box 20 will be described with reference to FIGS. 2 and 3. First, as shown in FIG. 2, the bolt hole 24 of the arm portion 23 of the body 21 is aligned with the screw hole 45 provided in the base portion 44 of the inverter case 40. Then, the arm portion 23 is fixed on the base portion 44 by the bolt 71. Accordingly, the body 21 is attached to the floor tunnel 12.

The cable cover 28 is then connected to the rear end of the body 21 and over the floor tunnel 12. Thus, the position of the bolt hole 39 of the fastening portion 38 of the flow regulating plate 30 and the position of the bolt hole 47 of the tongue portion 46 of the inverter case 40 are aligned. A bolt 72 is passed through the bolt holes 47 and 39, and the bolt 72 is screwed into the fixing nut 73 (see FIG. 6) to fasten the fastening portion 38 in front of the flow regulating plate 30 to the tongue portion 46. When the fastening portion 38 is fastened to the tongue portion 46, the flow regulating plate 30 extends from the tongue portion 46 disposed at the upper rear of the inverter case 40 toward the vehicle rear obliquely downward.

Next, the front end of the end panel 25 is connected to the rear end of the body 21, and the lower end of the end panel 25 is connected to the upper end of the cable cover 28.

As described above, the body 21 is attached to the upper surface 12A of the floor tunnel 12 via the inverter case 40 disposed therein. Since the inverter 50 is mounted inside the inverter case 40, when the body 21 is mounted in the floor tunnel 12, the inverter 50 is housed inside the body 21. The flow regulating plate 30 is accommodated in the cable cover 28 and extends from the upper rear side of the inverter case 40 toward the vehicle rear obliquely downward. As shown in FIG. 6, the rib 28A of the cable cover 28 protrudes toward the upper surface of the flow regulating plate 30. When the cable cover 28 is mounted on the floor tunnel 12, the high-voltage cable 60, the connector 61, and the connection terminal 51 are accommodated in the cable cover 28. The flow regulating plate 30 covers the high-voltage cable 60, the connector 61, and the connection terminal 51 from above.

As shown in FIG. 6, the high-voltage cable 60 extends above the floor tunnel 12 toward the rear of the vehicle, and extends from the rear end of the cable cover 28 toward the rear of the vehicle. The high-voltage cable 60 passes between the floor panel 11 and the floor trim 14 and extends upward from the front surface of the rear floor panel 13 toward the upper surface 13A of the rear floor panel 13. The rear floor panel 13 extends between the upper surface 13A and the rear seat 15 toward the rear of the vehicle.

Next, referring to FIGS. 4 and 6, the flow of water to the vehicle cabin 10 when electrified vehicle 100 travels across the river will be described.

A two-dot chain line 91 illustrated in FIG. 6 indicates the water level of water that has entered the vehicle cabin 10 during the transit of the river. As shown by the two-dot chain line 91, the water level during the transit of the river is lower than that of the inverter 50, and the inverter 50 is not submerged.

On the other hand, a dashed-dotted line 92 shown in FIG. 6 indicates the water level when electrified vehicle 100 accelerates during the transit. When electrified vehicle 100 is accelerating, the water is pushed toward the rear of the vehicle cabin 10, so that the water level behind the vehicle cabin 10 increases. In addition, since the momentum of the water flow increases, a wave stands on the water surface as indicated by a curved arrow 93 shown in FIG. 6. As shown in FIGS. 4 and 5, the lower surface 31A of the plate-shaped portion 31 is provided with protruding portions 32 extending in the front-rear direction of the vehicle. Waves generated on the water surface, as shown by arrow 90 in FIG. 4, since the flow is rectified by the protruding portions 32 to the vehicle rear, the wave hitting the lower surface 31A of the plate-shaped portion 31 can be suppressed backward flow to the vehicle front. As a result, it is possible to suppress water from being applied to the inverter 50.

Further, as shown in the arrow 90A in FIG. 4, the water hitting the lower surface 31A of the plate-shaped portion 31 is guided by the flanged 35A, 36A of the left and right side end portions 35 and 36 to collect at the center in the vehicle-width-direction. It then flows out of the rear end portion 37. As described above, since the water flowing along the lower surface 31A of the plate-shaped portion 31 is collected in the central portion behind the plate-shaped portion 31 and is caused to flow out from the central portion to the rear of the vehicle, the position where the wave rise of the water entering into the vehicle cabin 10 occurs can be set as the rear of the vehicle separated from the inverter 50. As a result, it is possible to suppress the water from being applied to the inverter 50 due to the wave rising.

Further, as shown by the curved arrow 94 in FIG. 6, a portion of the water flowing out from the rear end portion 37 of the flow regulating plate 30 may flow toward the front of the vehicle around between the plate-shaped portion 31 and the cable cover 28. Since the flow of water toward the front of the vehicle is blocked by the rib 28A provided in the cable cover 28, it is possible to suppress the water that has circulated between the plate-shaped portion 31 and the cable cover 28 from being applied to the inverter 50.

As described above, electrified vehicle 100 can suppress water from being applied to the inverter 50 disposed on the floor tunnel 12 during the transit of the river.

In the above description, the electrical component is the inverter 50, but the present disclosure is not limited thereto. For example, the electrical component may be a control device such as an ECU or a battery.

What is claimed is:

1. An electrified vehicle comprising:
- an electrical component that is disposed on a floor tunnel; and
- a flow regulating plate that extends from a rear portion of the electrical component toward a vehicle rear obliquely lower side, wherein the flow regulating plate includes, on a lower surface, a protruding portion that extends in a vehicle front-rear direction.

2. The electrified vehicle according to claim 1, wherein:
- in the flow regulating plate, right and left side end portions are connected to a rear end portion that extends in a vehicle width direction with the right and left side end portions inclined toward a center in the vehicle width direction as the right and left side end portions approach a vehicle rear side; and
- the right and left side end portions include flanges that extend in a downward direction.

3. The electrified vehicle according to claim 1, further comprising:
- a console box that accommodates the electrical component and the flow regulating plate inside the console box, wherein:
- the console box includes
  - a body that is attached to an upper portion of the floor tunnel and accommodates the electrical component inside the body, and
  - a cable cover that is disposed adjacent to a rear side of the body and accommodates the flow regulating plate inside the cable cover; and
- the cable cover includes a rib that projects toward the flow regulating plate on a surface facing the flow regulating plate and extends in a vehicle width direction.

4. The electrified vehicle according to claim 3, wherein:
- the electrical component is accommodated in a component case;
- the component case is attached to an upper portion of the floor tunnel; and the flow regulating plate is attached to an upper rear side of the component case and extends from the component case toward the vehicle rear obliquely lower side.

* * * * *